Aug. 3, 1926.
L. J. STAFFORD
1,594,984
FIELD AND GARDEN IMPLEMENT
Filed July 9, 1924
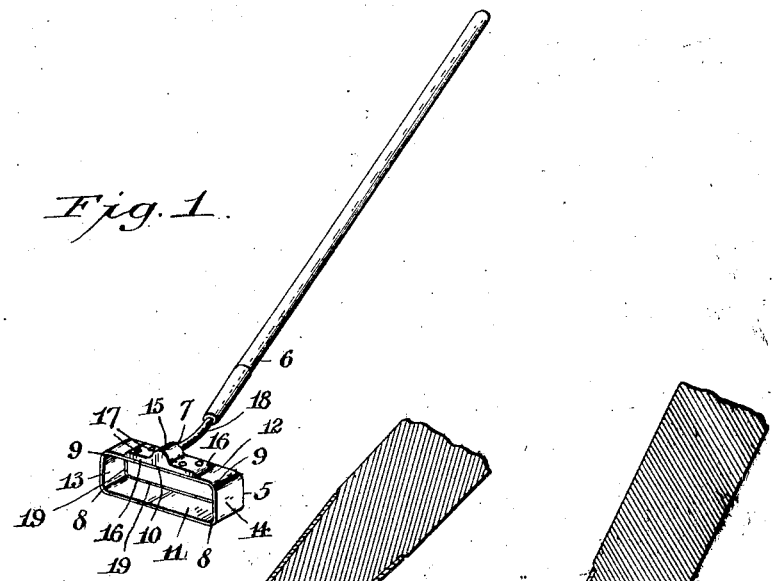
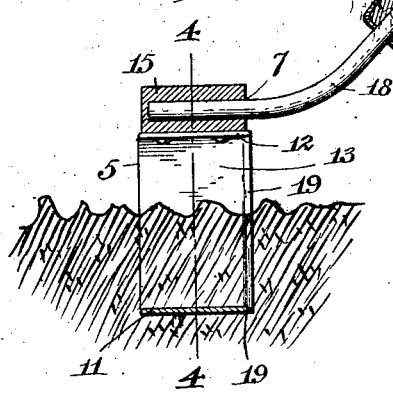
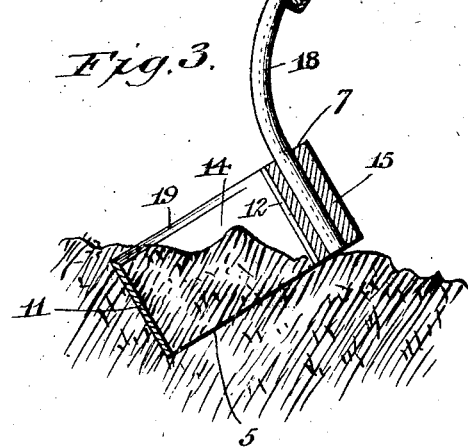
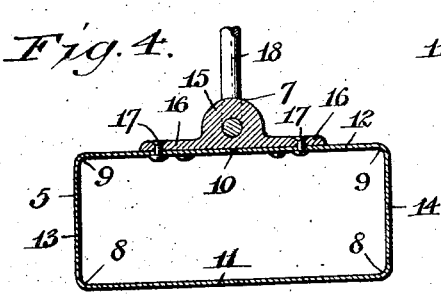
Lilly J. Stafford, Inventor
By Emil Kerhart
Attorney.
Witness:
J. J. Oberst.

Patented Aug. 3, 1926.

1,594,984

UNITED STATES PATENT OFFICE.

LILLY J. STAFFORD, OF GOWANDA, NEW YORK.

FIELD AND GARDEN IMPLEMENT.

Application filed July 9, 1924. Serial No. 725,002.

My invention relates to a field and garden implement in the form of a combined hoe and cultivator.

One of the objects of my invention is to provide a field and garden implement which can be used either as a hoe or as a cultivator, and which is so constructed that one edge of the tool is arranged with reference to the angularity of the handle of the implement, that when using said edge, the blade of the tool will be forced into the ground a considerable distance under action similar to that of an ordinary garden hoe; while when using the other edge thereof, the position of the blade is such with reference to the angularity of the handle that the ground is lifted and left mellow or in the form of fine mulch, the ground being disturbed and loosened to a comparatively slight depth, without displacing any considerable portion thereof, this being particularly desirable when cultivating small plants and various kinds of vegetation grown in rows.

Another object of my invention is to provide an implement which is highly efficient for cultivating and hoeing field crops, such as potatoes, corn, grapes, berries, nursery stock, etc., and which is superior to an ordinary hoe in mixing mortar, concrete, etc., as it turns and mixes the material more thoroughly and much quicker, and its construction permits of its entering the corners or angles of a mortar box, which is not possible with an ordinary hoe.

A further object of my invention is to provide an implement of this kind, which has a head of rectangular or loop formation, and is transversely elongated so as to provide two comparatively long transverse members and two short side or end members connecting said transverse members, opposite edges of one of said transverse members and those of the end members providing operating edges; said head having a handle secured thereto, which is preferably disposed at an angle of 45 degrees, or approximately so, so that when the implement is used by a person of ordinary stature, the head of the implement will be so positioned when using one edge of the same, that a chopping action will result therefrom by reason of the head being driven into the ground at a reverse angle to the position of the handle, and, when reversing said head, it will be forced into the ground a comparatively short distance, and the outer transverse member thereof, or what may be termed the operating blade, will move through the ground in a position approximately parallel with the surface of the ground, by drawing upon the handle.

With the above and other objects in view to appear hereinafter, the invention consists in the construction and arrangement of parts to be hereinafter described and more particularly pointed out in the subjoined claims.

In the drawings:—

Fig. 1 is a perspective view of the combined hoe and cultivator.

Fig. 2 is a enlarged longitudinal section taken in the plane of the handle and showing the position of the parts thereof when using the implement as a cultivator.

Fig. 3 is a similar section showing the position of the parts thereof when using the same as a hoe.

Fig. 4 is a transverse section through the head taken on line 4—4, Fig. 2.

The implement comprises a head 5, a handle 6 and a connector 7 fastened to the head and having the handle 6 attached thereto. The head 5 is formed of sheet steel or other sheet material fashioned from a strip bent at equal distances from the center of the strip, as at 8, thence bent equal distances from the bent portions 8, as at 9, and having the ends thereof abutting, as at 10, thus forming a rectangular or loop-shaped head having comparatively long transverse walls 11, 12 and end walls 13, 14 connecting corresponding ends of said transverse walls.

The connector is in the form of a casting having some weight and being transversely extended so as to cover a considerable portion of the outer surface of the inner transverse wall 11. Said connector has an enlarged intermediate portion 15 and lateral wings 16 through which and said inner transverse wall 11, rivets 17 are passed to fasten the connector securely to said transverse wall.

The connector has one end of a rod 18 cast therein, which rod extends through the major portion of the enlargement 15 of said connector. The other end of said rod is fastened in the end of the handle 6 in any suitable manner. Said rod is curved between its ends so that one end thereof is disposed at an angle to the other, preferably approximating an angle of 45 degrees. The connector or casing 7 furnishes the necessary weight for the head of the implement so that it can be driven into the ground with ease, and so that the head can be made of comparatively light sheet material.

One edge of the outer transverse wall or blade 12 and the corresponding edge of each end wall 13, 14, is beveled, as at 19, to form cutting edges, which may be termed cultivator edges. When the head of the implement is used as shown in Fig. 2, the cultivator edges cut easily into the ground and without using great effort may be drawn along underneath the surface portion of the ground, as indicated in Fig. 2, so as to loosen the upper or surface portion without displacing it to any considerable extent, thereby creating a mulch which will permit free evaporation. When the cultivator edges are thus used and the head drawn toward the user, the outer transverse wall is positioned parallel, or substantially parallel with the surface of the ground so that it is only necessary to draw inwardly or rearwardly by short strokes without removing said operating member or blade from the ground. Thus, by short strokes, the ground can be easily and conveniently loosened around small plants without withdrawing the entire head from the ground.

It is to be noted that the handle is at substantially an angle of 45 degrees to the cultivating edge of the operating blade so that during the use of the implement, the operating blade assumes a substantially horizontal position. When so using the implement, the sharpened edges of the end walls cut through the ground and therefore comparatively little effort is necessary in order to draw the head of the implement rearwardly through the ground.

When using the implement as a cultivator, it will be noted that the curved portion of the rod 18 has its concaved portion at the top or front.

When using the implement as a hoe, the implement in reversed so that the concaved portion of the rod 18 is at the rear or bottom, and the head at an angle to the surface of the ground. When thus used, those edges of the operating blade or member 12 and of the end members 13, 14 opposite the cutting edges of the head, are brought in contact with the ground, and by a chopping action, the operating blade 12 and parts of the end members 13 and 14 are forced into the ground; said blade 12 assuming substantially the same position as the blade of an ordinary hoe. When so using the implement, the ground is invariably displaced or re-located, but it is of course to be understood that by gently chopping into the ground without drawing the implement rearwardly, large lumps of ground may be reduced to small pieces in the same manner as with an ordinary hoe.

By connecting the sheet metal head with the handle by means of a connector having considerable weight, no great effort is required in driving the hoe edges, which are those opposite the cutting or cultivator edges 19, into the ground, and by the use of such a connector, a durable and exceedingly useful implement is provided.

Having thus described my invention, what I claim is:—

1. A field and garden implement having a head formed of a strip of sheet metal bent into rectangular formation and having the ends of the strip of metal abutting, a connector riveted to opposite ends of said strip of metal to maintain said ends in abutting relation, and a handle immovably fastened to said connector.

2. A field and garden implement, comprising a head formed of sheet metal bent into rectangular formation and having opposite ends of said sheet metal abutting centrally of the head, a connector comprising a casting having lateral wings and a curved rod extending centrally from said casting, fastening means passing through the wings of said connector and through opposite end portions of said sheet metal to maintain the ends of said sheet metal in abutting relation, and a handle secured to the opposite end of said rod.

In testimony whereof I affix my signature.

LILLY J. STAFFORD.